April 7, 1931.  L. CHAVANNE  1,799,886
PROCESS FOR THE GASIFICATION OF SOLID FUEL
Filed May 25, 1925   2 Sheets-Sheet 1
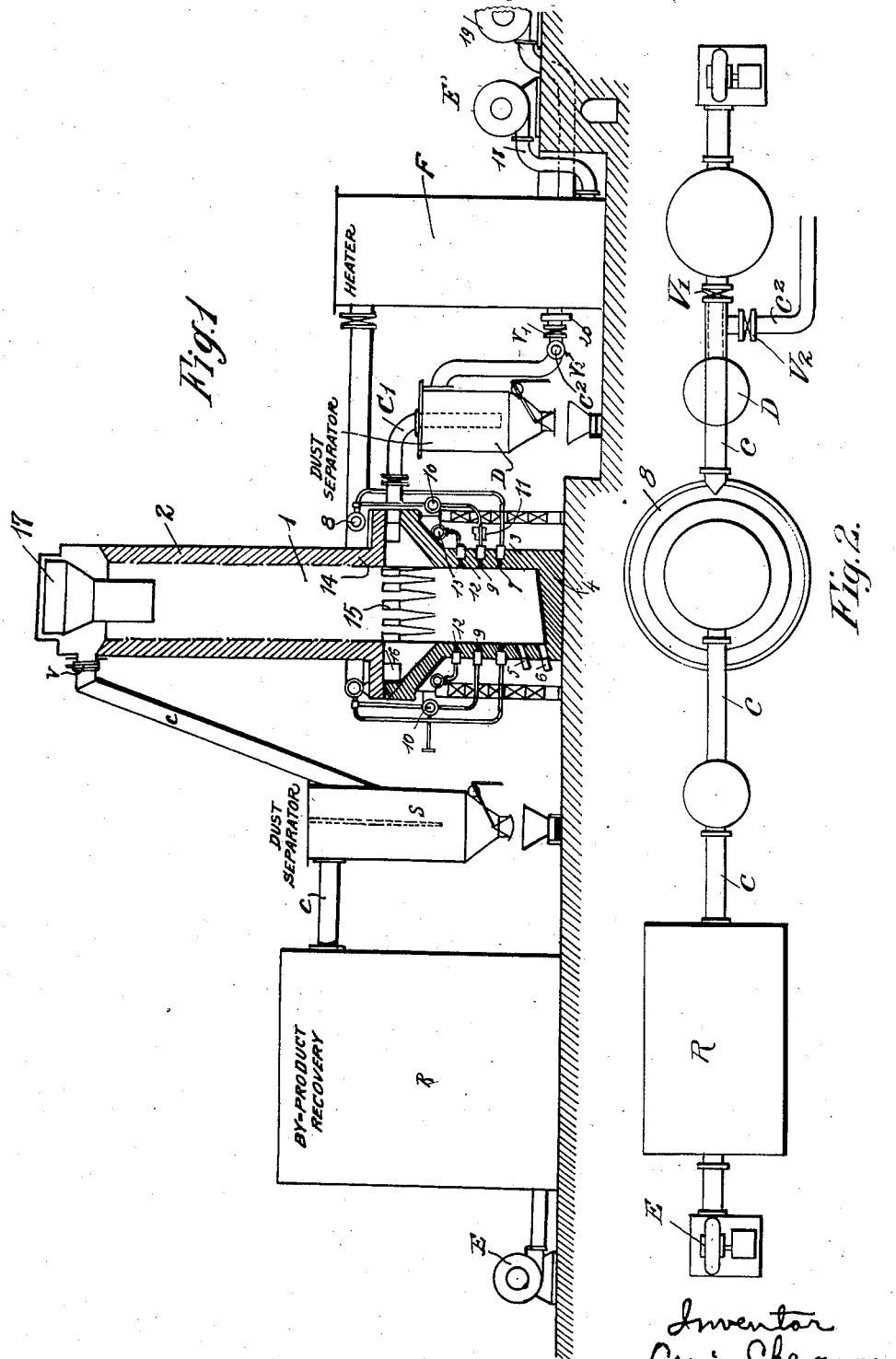

Patented Apr. 7, 1931

1,799,886

UNITED STATES PATENT OFFICE

LOUIS CHAVANNE, OF PARIS, FRANCE

PROCESS FOR THE GASIFICATION OF SOLID FUEL

Application filed May 25, 1925, Serial No. 32,790, and in France July 29, 1924.

My invention provides a process of gasification of any solid fuel by way of melting ashes, whereby certain drawbacks are avoided. The continuous gasification is realized by applying certain new steps which can be combined with those disclosed in the specification of my prior application Ser. No. 8,810 of February 12, 1925.

The process includes creating in the fuel column, at selected levels, exothermical effects and endothermical effects to realize and to maintain a very hot and preferably thin zone of fusion and a large zone of distillation at a relatively low temperature, both summitted to a suitable regimen of temperatures. The expression "suitable regimen of temperatures" means the gradient of temperatures which extends from the hot thin zone of fusion to the top of the large zone of distillation; the gas temperature within the lower portion of the fuel column may be around 1500° C. and above, to decrease progressively when gases rise through the solids so as to be reduced to 350° C. and even much less at the upper lever of the charge.

The solid lumps of fuel, such as coal, lignite, etc., (as they exist naturally or resulting from agglomerated slack) and the additions, such as fluxes and other materials, if necessary, are charged at the producer top as usual. The fuel dust, such as fines and ground coal, is introduced into the zone of fusion by suitable means such as mechanical projection, blowing, etc. The fuel dust can also be mixed with additions of suitable materials such as fluxes, ores, and the like used preferably in pulverulent state.

Gas removals are effected at various levels of the fuel column, at the upper part of the zone of fusion for a portion of the producer gas and, in the zone of distillation, for the gases of distillation and the condensible by-products which are carried out by the portion of producer gas rising through the zone of distillation.

The continuous gasification (exothermical effect) is produced by blowing at the bottom of the fuel column a blast of air or of other fluid mixtures which contains free oxygen and eventually fluids producing with fuel endothermical reactions, the temperature of said blast being mainly dependent on its content in free oxygen and the nature of its other constituents and of the treated fuel mixture; the developed heat must be at least sufficient to melt the non-gasifiable materials and to insure other endothermical reactions.

The endothermical effects will result from:

(a) The introduction of the fuel dust directly into the zone of fusion. It has been observed that fuel dust (even though heated and although heat is produced by its gasification into CO) generates gas at a lower temperature than the prevailing temperature at the level of the introduction, which is generally 2,370° F. for the usual slag composition (1,300 to 1,400° C.), but which may be higher when the blast contains more free oxygen than atmospheric air;

(b) The withdrawal of a portion of the producer gas at suitable levels of the fuel column;

(c) Mixing selected materials such as lean ores, limestone, iron and steel scraps, etc. with the charges and according to the case with the injected fuel dust, the heating, the fusion, the decomposition, and the volatilization of these materials absorbing heat at various suitable levels of the fuel column.

The production of certain of these exothermical and endothermical effects insures in the column of fuel mixture:

1. A thin zone of fusion at high temperature in which the carbon is gasified almost entirely into CO and an extended zone of distillation at progressingly decreasing low temperatures, from which gases are derived carrying out a maximum quantity of high-grade condensible by-products;

2. Rate of gasification increases with increased percentage of free oxygen of the blast provided that the percentage of fluid in the blast generating endothermical reactions does not exceed a certain ratio;

3. Very hot producer gas, obtained by deriving a portion of the rising gases from the zone of fusion, the derived gases having a high temperature of combustion because of their high sensible heat and mainly because of their possible rich composition in burning elements, the latter depending on the amount of free oxygen contained in the blast in ratio to the percentage, in said blast, of fluids generating endothermic reactions;

4. High-grade gases (having around 450 B. t. u. per cubic foot) derived from the extended zone of distillation;

5. The possibility of mixing in any proportion the derived producer gas and the gases from the zone of distillation;

6. The recovery of by-products of higher value than that of the materials of the charge;

7. The pressure inside the producer decreases with the amount of derived gases; consequently there is a lesser consumption of power for the blast;

8. A balanced regimen of temperatures in the whole fuel column.

Among the different forms of construction of gas producers suitable for carrying out the present invention in practice an example illustrated in the accompanying drawings has been selected. This example is given as a mere explanation only and does not limit the scope of the invention. As the present process may be applied with the characteristics disclosed in the specification of my application Ser. No. 8,810 it is obvious that the blasting devices mentioned below could be arranged in a different manner.

In this drawing Figure 1 is a vertical section of one form of gas producer where the ashes are melted in accordance with this invention, i. e., where means are provided for differential charging of the fuel, differential extraction of the gases and a suitably heated blast of fluids containing free oxygen.

Figure 2 is a plan of the gas producer and its connected apparatus.

Figure 3:
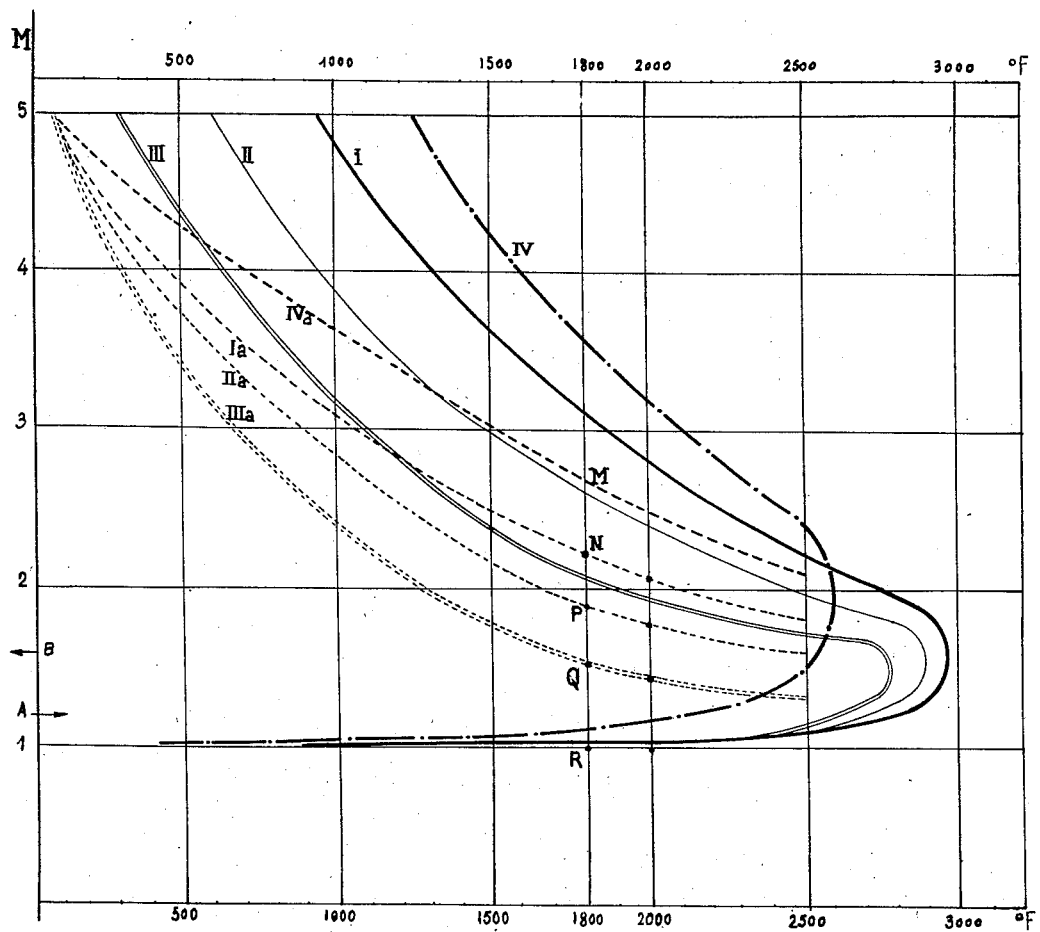
Figure 3 is a diagram showing the regimen of temperatures of the zones for given continuous working conditions.

The chart, Figure 3, shows separately by curves the individual action of each means and their combined actions, which can be used to realize and maintain a thin zone of fusion and a very extended zone of distillation at low temperature, thus insuring a balanced regimen of temperatures. The example chosen is related to the treatment of coal having 45% of ashes and 15% of volatile matter, the ashes becoming pasty around 1,800° F. The temperature of the corresponding running slag may be taken at around 2,500° F. Regarding the composition of the blast and its temperature it is pointed out that very many blast mixtures are suitable for a regimen of temperatures corresponding to the main curve of Figure 3, provided that the injection of fuel dust, and possibly also the proportion of derived producer gas, are conveniently regulated; it is also obvious that gas of various compositions correspond to various blast mixtures.

In the slagging gas producer the zone of fusion extends from the region of the twyers to the region where the average temperature of the solids is around 1,800° F.

The curve I, in full lines, is the curve of the temperatures of the rising gases, and the curve I$^a$, in dotted lines, is the curve of the temperatures of the descending solids in a gas producer which is not operated according to the present invention, but which can be operated as explained hereafter. The height of the zone of fusion (NR) is, in this case, relatively large, a little more than one fourth of the total height of fuel column. In this case, from slight variations of temperatures there can result hanging up of the charge, extension of the pasty zone and clogging up of the producer.

The injection of the fuel dust in the zone A creates, by heating of these fines and by the fusion of their ashes and by heating of the produced gases, an endothermical effect which has for its result to restrict the isotherms in the gas producer; the curves are altered as shown by curves II and II$^a$, the full line II showing the temperature of the gases, the dotted line II$^a$ that of the solids; the height of the zone of fusion (PR) is clearly lower than one fourth of the total height of the fuel column, and the extended range of low temperatures of the upper zone characterizes a zone of distillation at low temperature.

The extraction at B of a portion of the producer gas evolved again modifies the regimen of temperatures, because the portion of the gas rising to the top has to heat the same quantity of materials fed in. The solids therefore arriving at level B being less hot and descending continuously are finally subjected to the sensible heat of the whole producer gas. Curves III and III$^a$ (continuous double lines for the gases, double dotted lines for the solids) show the alteration of the regimen of temperatures brought about by the combination of introducing fine material directly in and extracting gases from the hot zones of the producer. The height of the zone of fusion (QR) is much reduced.

The flattening of the zone of fusion and the corresponding increase of the greatly extended zone of distillation and its lower temperatures at the top of the producer clearly shown in Figure 3 are also the results of the combined actions of the above-mentioned means. Owing to the increase of the length of the zone of distillation and its lowered temperature the fuel is submitted during a longer time to a lower range of temperature and the result is that the condensible products are increased in quantity and quality.

In order to clearly demonstrate the advantages of the process, the same chart shows curves IV and IV$^a$ for a known type of gas producer with melting of ashes and treating the same fuel as above. The height of the zone of fusion (MR) is greater than one third of the total height of the fuel column and hangings frequently occur in this zone. Further, in this case low-temperature distillation is out of question.

As illustrated in Figures 1 and 2, the gas producer 1 is composed of a cylindrical or slightly conical shaft 2 which may be provided with a cylindrical or slightly conical bosh and a cylindrical crucible 3 whose walls are formed of refractory material.

The crucible is provided with at least one tap hole 5 for the slag and a hole 6 for tapping molten metal. Above the crucible is a primary row of blast twyers 7 in connection with a pipe 8 in which circulates a fluid mixture containing free oxygen; a second row of horizontal or inclined twyers 9 serve to inject the coal dust and other pulverized material supplied by distributors 11 of a known type to a pipe 10 supplied through pipe 8 with fluid mixtures; a third row of horizontal or inclined twyers 12 is connected to the pipe 13 or to series of pipes appertaining to sources of steam, carbon dioxide, etc., for producing, when desired, endothermic effects. These latter twyers are not absolutely necessary for the operation of the aparatus. According to the fuel to be treated and the content in free oxygen of the fluids used to produce gasification, one or more twyers 9 may be employed in place of twyers 12, the selected twyers being connected to the pipe 13; moreover, twyers 9 and even twyers 12 may be used to charge, through the medium of the fluid blown, flux such as lime, limestone, fluorspar, and the like, or metallic compounds or metalloidic compounds. The recesses for the twyers are such that the position of such twyers and their connections to their respective pipes can be suitably adjusted. Around the bosh 14 are the orifices 15 of the flue 16.

The upper portion of the shaft is extended by charging apparatus 17 of a known type and preferably of a continuous distribution type. The conduit or collector $c$ provided with a valve V starts from the upper collar of the shaft; collector $c$ brings part of the generated producer gas to the dust separator S (which is insulated for preventing condensation of the hydrocarbons), then to an installation for the recovery of the by-products, and then to the extractor E.

The conduit or collector C' starting from the gas outlet 16 leads part of the producer gas to the dust separator D (which is lined internally with refractory material); the gas after passing through valve V' goes into the heat interchanger F and from thence to extractor E'. The burner 20 burns gas derived from conduit C' or from auxiliary pipe $C^2$. The junction of conduit C' and gas outlet 16 should be perfectly fluid-tight and may be cooled by a water circulation.

An apparatus such as a fan 19 sucks (from a known arrangement not illustrated and comprising an apparatus whose delivery can be varied) fluid mixtures containing free oxygen and forces it through the heating circuit (which utilizes the sensible heat of the gases as well as, if necessary, that of their combustion) and beyond the circuit into the pipe 8 connected to the blast twyer 7 of the gas producer. The pipe 10 is supplied with the same fluid mixture as supplied to pipe 8 or with other suitable mixtures, as the corresponding arrangements are of a known type they are not shown in the drawings.

It will be seen that gaseous currents will be established in each conduit C and $C^1$ according to the position of the valves V, $V_1$ and $V_2$ or according to the amount of vacuum caused in these conduits operating the extractors or according to the effects of these various apparatus combined together. The controlling of said valves modifies the proportion of the ascendant hot gases and works to obtain the suitable regimen of temperatures.

Any other form of shaft producer of the cupola type whether water jacketed or not, whether circular, square, rectangular, etc., might have been selected to illustrate the invention. Moreover, the gas producer may be constructed of any suitable material and may be of any suitable size and construction adapted for the objects desired and to the means of operation.

What I claim is:

1. A process of gasification of solid fuels by way of melting ashes, which comprises introducing the fuel lumps of the charges at the top of the fuel column, blasting at the bottom of the column a fluid mixture containing free oxygen, maintaining a thin zone of fusion where ashes are melted and an extended zone of distillation at relatively low temperatures, separately introducing fuel dust in the zone of fusion, collecting gases and products carried by said gases, and removing molten products.

2. A process of gasification of solid fuels, which comprises introducing the charges at the top of the fuel column, blasting at the bottom of the column a fluid mixture containing free oxygen, part of the mixture reacting endothermically on the fuel, maintaining a thin zone of fusion where ashes are melted and an extended zone of distillation at relatively low temperatures, separately introducing dust portions of the charges in the zone of fusion, collecting gases and products carried by said gases, and removing molten products.

3. A process of gasification of solid fuels, which comprises introducing the charges at the top of the fuel column, blasting at the bottom of the column a fluid mixture containing free oxygen, maintaining a thin zone of fusion where ashes are melted and an extended zone of distillation at relatively low temperatures, entraining dust portions of the charge into the zone of fusion by said mixture, collecting gases and products carried by said gases, and removing molten products.

4. A process of gasification of solid fuels, which comprises introducing the charges at the top of the fuel column, blasting at the bottom of the said column a heated fluid mixture containing free oxygen, maintaining a thin zone of fusion by insuring therein endothermic reactions, separately introducing dust fuels and materials including fluxes and ores in the zone of fusion, melting non-volatile materials in said zone, collecting gases and products carried by said gases, and removing molten products.

5. A process of gasification of solid fuels, which comprises introducing the charges at the top of the fuel column, blasting at the bottom of the column a fluid mixture containing free oxygen, maintaining a thin zone of fusion and an extended zone of distillation at relatively low temperatures, entraining dusty fuels and materials including fluxes and ores into the zone of fusion, melting non-volatile materials in said zone of fusion, collecting gases and products carried by said gases, and removing molten products.

6. A process of gasification of solid fuels, which comprises introducing the charges at the top of the fuel column, blasting at the bottom of said column an oxygen-containing gaseous mixture, maintaining a zone of fusion, separately introducing dust fuels and materials including fluxes and ores in the zone of fusion to insure endothermic reactions, melting non-volatile materials in said zone, collecting combustible gases and products carried by said gases, and removing slag and molten products.

7. A process of gasification of solid fuels, which comprises introducing the charges at the top of the fuel column, blasting at the bottom of said column an oxygen-containing gaseous mixture, maintaining a zone of fusion and a zone of distillation, separately introducing dust fuels in the zone of fusion, melting in said zone of fusion the non-volatile materials, extracting gases at selected levels of the fuel column, to adjust the height of said zone of fusion and the height of the extended zone of distillation at relatively low temperatures, collecting combustible gases and products carried by said gases, and removing slag and molten products.

8. A process of gasification of solid fuels, which comprises introducing the charges at the top of the fuel column, blasting at the bottom of said column an oxygen-containing gaseous mixture, maintaining a zone of fusion, separately introducing dust fuels and materials including fluxes and ores of the charge in the zone of fusion for absorbing heat at corresponding levels of said column as to insure therein the proper regimen of temperatures, collecting combustible gases and products carried by said gases, and removing slag and molten products.

9. A process of gasification of solid fuels, which comprises introducing the charges at the top of the fuel column, blasting at the bottom of said column an oxygen-containing gaseous mixture, maintaining a zone of fusion, separately introducing in and above the zone of fusion dust fuels mixed with materials to absorb heat at various levels of said column for maintaining the proper regimen of temperatures in the column, melting non-volatile materials in said zone, collecting combustible gases and products carried by said gases, and removing slag and molten products.

10. A process of gasification of solid fuels, which comprises introducing the charge at the top of the fuel column, blasting at the bottom of said column an oxygen-containing gaseous mixture, maintaining a zone of fusion, separately introducing dust fuels and materials including fluxes in the zone of fusion, mixing selected materials with the charge to absorb heat at settled levels of the fuel column, injecting fluid mixtures causing endothermic reactions in said zone, melting non-volatile materials in said zone, collecting combustible gases and products carried by said gases, and removing slag and molten products.

11. A process of gasification of solid fuels, which comprises introducing the charges at the top of the fuel column, blasting at the bottom of said column an oxygen-containing gaseous mixture, maintaining a zone of fusion, separately introducing dust fuels in the zone of fusion, melting non-volatile materials in said zone, withdrawing gases from selected levels of the column, mixing with the charge materials to absorb heat at various levels of the column, collecting combustible gases and products carried by said gases, and removing slag and molten products.

12. A process of gasification of solid fuels, which comprises introducing the charges at the top of the fuel column, blasting at the bottom of said column an oxygen-containing gaseous mixture, maintaining a zone of fusion, separately introducing dust fuels in the zone of fusion, blowing in said zone fluid mixtures causing endothermic reactions, melting non-volatile materials in said zone, variably withdrawing gases at selected levels of the column, variably adding heat absorbing materials to the charge, controlling the withdrawal of gases and addition of materials to the charge to insure a proper regimen of temperatures, collecting combustible gases and products carried by said gases, and removing slag and molten products.

In testimony whereof I have affixed my signature.

LOUIS CHAVANNE.